Patented Jan. 21, 1947

2,414,748

UNITED STATES PATENT OFFICE 2,414,748

HALOGENATED CROSS-LINKED AROMATIC AMINE POLYMER

Samuel S. Kistler, West Boylston, Mass., assignor to Norton Company, Worcester, Mass., a corporation of Massachusetts No Drawing. Original application September 17, 1941, Serial No. 411,249. Divided and this application April 18, 1944, Serial No. 531,649

6 Claims. (Cl. 260—42)

This invention relates to resinous compositions and methods of making the same.

This application is a division of my copending application Serial No. 411,249 filed September 17, 1941, which was a continuation in part of a copending application Serial No. 318,004 filed February 8, 1940, which in turn was a division of my prior application Serial No. 306,545 filed November 28, 1939 and patented February 10, 1942, No. 2,272,873.

One object of the invention is to provide a new type of resin.

Another object of the invention is to provide a resin capable of general use as well as for a bond for the manufacture of grinding wheels and other abrasive bodies.

Another object of the invention is to provide an aniline aldehyde type of resin which has an ingredient capable of causing additional curing thereof when heated.

Another object of the invention is to provide a method of improving an aniline formaldehyde polymer.

Other objects will be in part obvious or in part pointed out hereinafter.

According to this invention, I have provided resinous compositions, and particularly polymeric resinous compositions comprising the reaction product of a halogenated organic compound, a halogenated aliphatic hydrocarbon or of such halogenated organic compound and an aldehyde, such as formaldehyde or furfural with the condensation product of an aldehyde and a primary aromatic amine. The halogenated organic compound alkylates the amino nitrogens of the aldehyde-amine condensation product, typically forming an alkylene or substituted alkylene cross-link between nitrogen atoms of adjacent molecules of the condensation product. Halohydric acid from the halogenated compound adds on to at least a portion of the nitrogen atoms to form halohydric salt combinations therewith. When an aldehyde is also reacted with the aldehyde-amine condensation product, further cross-linkages are formed, typically linking aromatic rings of adjacent molecules of the condensation product with methylene or substituted methylene radicals attached to the carbon atom of the aromatic ring adjacent to the amino nitrogen linkage of the condensation product. The reaction products thus obtained are particularly useful as the bond for abrasive articles.

I provide a quantity of a primary aromatic amine, such as aniline, meta phenylene diamine, meta toluidine, or diamino diphenyl methane; a quantity of an aldehyde, such as formaldehyde or furfural; and an organic compound containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. According to the invention, aniline

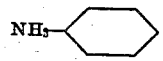

or other primary aromatic amine is reacted with formaldehyde, HCHO, or with furfural

in the presence of a strong acid to produce a long chain polymer which, when an excess of formaldehyde or furfural above the stoichiometric proportions is used, for example 20% excess, has adjacent chains connected with methylene, —$CH_2$—, or substituted methylene

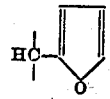

groups to form a tough, heat resistant, semi-thermoplastic resin. I may add some of the aldehyde after the initial condensation, and my invention clearly contemplates that one aldehyde may be used at one stage, and a different aldehyde may be used at another stage.

As examples of the halogenated organic compound, I may use an organic aliphatic chlorinated polymer selected from the group of polyvinyl chloride, polyvinylidene dichloride, rubber hydrochloride, chlorinated rubber and chlorinated polyisobutylene. Most of the examples are chlorinated compounds because these are cheaper and more readily available than the brominated or iodated compounds, but the latter two give effective results. The fluorinated compounds are rejected because they are too stable and will not alkylate the polymer nor provide hydrogen halide for reaction at the grinding line of a grinding wheel.

I believe that the novel resin of the invention has utility for many purposes, such as for the manufacture of many types of molded articles, and especially for use as the binder for sandpaper or abrasive cloth, and for abrasive discs, and for the adhesive for abrasive coated polishing wheels such as are referred to as "set-up wheels." However, the principal use of the resin of my invention is for the bond of grinding wheels, and for other solid abrasive articles, such as segments, sectors, honing sticks and the like. Accordingly, whereas it should be understood that the resin may be formed without abrasive filler, or with any other filler, such as sawdust, graphite, carbon, asbestos, cloth or quartz, in the examples I shall describe the manufacture of grinding wheels. The technique for manufacturing other solid abrasive is substantially the same.

I, therefore, provide a quantity of abrasive grain. Any abrasive grain may be used, for example, any of the varieties of alumina, such as emery, corundum, dense "regular" fused alumina, porous fused alumina, silicon carbide, and other hard carbides, quartz, glass, garnet or diamonds. Considering now specific examples of the manufacture of grinding wheels in accordance with the present invention, I may proceed as follows:

Example I

Eight hundred and fifty-eight cubic centimeters of aniline were dissolved in eight liters of water containing nine and three-tenths mols of hydrochloric acid. To this was added seven hundred and fifty cubic centimeters of formalin solution containing four-tenths gram of formaldehyde per cubic centimeter. After standing for one hour, a quantity of sodium hydroxide was added equivalent to the hydrochloric acid present. The precipitated resin was filtered, washed, dried and ground to a fine powder. Into each ten pounds of this powdered resin I mixed two and two-tenths pounds of polyvinyl chloride. Twenty-eight and one-tenth pounds of a porous, relatively pure grade of fused alumina abrasive No. 20 grit size was wet with twenty-three hundredths of a pound of furfural. Then five and nine-tenths pounds of the above resin were intimately mixed with the fused alumina wet with furfural, spread in an eighteen inch mold with a five inch arbor, and hot pressed for one hour and a half at a temperature of 160° C. under a pressure of three tons per square inch. The wheel was then stripped from the mold.

This made an excellent snagging wheel and, in fact, a superior snagging wheel when compared with any organic bonded snagging wheel.

Example II

Thirty-seven pounds of fourteen mesh fused alumina abrasive was placed in a mixing pan and wet with five hundred and forty cubic centimeters of furfural. To this were added nine pounds of the resin from Example I and two pounds of cryolite. The mixture was spread in a sixteen inch mold with a six inch arbor and hot pressed for two hours at a temperature of 160° C. and under a pressure of five hundred tons. The wheel so produced gave as good a finish on stainless steel as rubber wheels, but was very much more durable.

Example III

Nineteen hundred and eighty grams of diamino diphenyl methane was dissolved in eight liters of water containing twenty mols of hydrochloric acid. To this solution was added eight hundred cubic centimeters of formalin solution containing four-tenths gram formaldehyde per cubic centimeter. After standing one hour a quantity of sodium hydroxide was added equivalent to the hydrochloric acid used. The precipitated resin was filtered, washed, dried and ground to a fine powder.

Eight hundred and eighty-five grams of sixty mesh fused alumina was mixed dry with one hundred and sixty grams of the above powdered resin and forty-nine grams of polyvinyl chloride. This mixture was spread in an eight inch mold and pressed at a temperature of 175° C. under a pressure of one hundred and fifty tons for half an hour. This constitutes a grinding wheel the resin bond of which is hard, tough and heat resistant. During a grinding operation the bond of such a wheel, as well as the bonds of the wheels of the other examples, liberates hydrogen chloride at the grinding line which appears to have a pronounced effect on the grinding operation. This acid gets to the surface of the work piece being ground without spreading it all over the work piece, thereby increasing the effectiveness of the grinding operation without etching the work piece or causing it to rust or otherwise detrimentally affecting it and without such disadvantages as spraying acid upon the operator, upon the grinding machine, or corroding the coolant pipes or coolant pump.

Example IV

Ten hundred and eighty grams of metaphenylene diamine was dissolved in eight liters of water containing twenty mols of hydrochloric acid. To this solution was added six hundred cubic centimeters of formalin containing four-tenths gram formaldehyde per cubic centimeter. After standing one hour a quantity of sodium hydroxide was added equivalent to the hydrochloric acid used. The precipitated resin was filtered, washed, dried, and ground to a fine powder.

Eight hundred and eighty-five grams of sixty mesh fused alumina was mixed dry with one hundred and sixty grams of the above powdered resin and forty-nine grams of polyvinyl chloride. This mixture was spread in an eight inch mold and pressed at a temperature of 175° C. under a pressure of one hundred and fifty tons for half an hour. This wheel has characteristics similar to the wheels of the other examples.

For the acid used in condensing the resin, besides hydrochloric and phosphoric acids, any of the following acids or many others may also be used:

Hydriodic acid
Tri-chloro acetic acid
Di-chloro acetic acid
Maleic acid
Oxalic acid
Sulphuric acid The requirement is that the acid should be at least as strong as phosphoric acid to give the best results.

Considering now the various features of this invention, when aniline is condensed with formaldehyde in the presence of a strong acid, we may have the following resin structure:

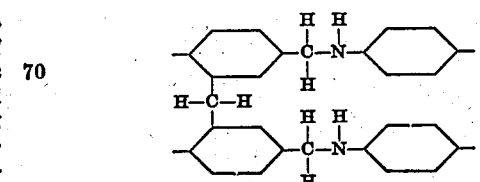

When furfural is used to condense the aniline, we may have the following resin structure:

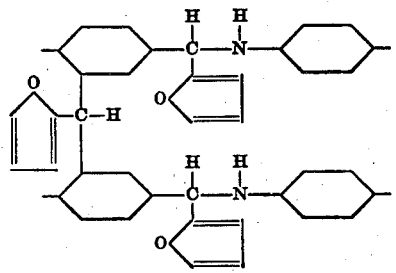

In each of the above cases the use of enough aldehyde to cross link has been assumed. Similar structural formulae may be written for meta toluidine, meta phenylene diamine and diamino diphenyl methane. When furfural is substituted in whole or in part for formaldehyde for the original condensation process, a furyl group will be found replacing one hydrogen atom attached to the carbon of some of the methylene groups connecting the amino groups to the opposite ring. It will be seen that it is more advantageous to plasticize the abrasive grains with furfural because thereby a number of additional linkages are provided in the polymeric structure, making it stronger.

It may be noted at this point that cold pressing can be resorted to by reason of the plasticizing of the abrasive grains with furfural. However, the results are not as satisfactory as when the hot pressing method is used. Furthermore, the addition of furfural definitely increases the plasticity and provides a better product when hot pressing.

It is thought that alkylation is represented by the connection of nitrogen atoms 1 to 2, 3 to 4, 5 to 6, 7 to 8 et cetera in a long chain series but not 2 to 3, 4 to 5, or 6 to 7. However, if less than the stoichiometric proportion of the alkylating compound is used (based on the above formula) fewer pairs of nitrogen atoms will be connected.

The above specified halogenated organic compounds which serve the purposes of my invention are halogen bearing, aliphatic alkylating compounds, and the reactive groups alkylate and cross link the adjacent resin chains. The reaction of the halogenated organic compound with the condensation product appears to cross link by alkylating the condensation product at the amino groups, and it is believed that typical resinous products of the invention may be represented by the following general structural formula which is repeated in a complex chain:

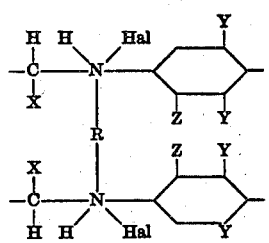

wherein X is selected from the group consisting of H and Y is selected from the group consisting of H, NH₂ and CH₃, Hal is selected from the group consisting of Cl, Br, and I, R is a bivalent radical selected from the group consisting of alkylene radicals, and halogenated alkylene radicals, and the adjacent Z's represent hydrogen or a methylene or furyl bridge between adjacent benzene rings.

While I have mentioned specific curing temperatures, it should be understood that the upper limit is determined only by the decomposition point of the resin. Temperatures short of 190° C. are safe. At the lower end, almost any temperature can be used but preferably above 60° C. but the lower the temperature, the more time to carry the reaction to completion. Practical results can be obtained with temperatures above 90° C.

The percentage of the polyvinyl chloride to the reactants including the polyvinyl chloride in Example II is 15.7%. The percentage of the polyvinyl chloride to the reactants including the polyvinyl chloride in Example III is 23.44%. The percentage in Example II is the lowest percentage of all of the examples and the percentage in Example III is the highest percentage of all of the examples, so therefore the range about 15.7% to about 23.44% is used in the claims.

It will thus be seen that there has been provided by this invention a composition of matter, an article of manufacture, and an art in which the various objects hereinabove set forth together with many thoroughly practical advantages are successfully achieved. As various possible embodiments might be made of the features of the above invention and as the art herein described might be varied in various parts, all without departing from the scope of the invention, it is to be understood that all matter hereinbefore set forth is to be interpreted as illustrative and not in a limiting sense.

I claim:

1. A halogenated cross-linked aromatic amine polymer comprising a condensation product of one molecular proportion of primary aromatic amine selected from the group consisting of aniline, metaphenylene diamine, meta toluidine and diamino diphenyl methane and at least one molecular proportion of aldehyde selected from the group consisting of formaldehyde and furfural, condensed in the presence of at least approximately one molecular proportion of acid at least as strong as phosphoric acid and reacted by heating at resin curing temperatures with from about 15.7% to about 23.44% on the weight of the reactants of an organic aliphatic chlorinated polymer selected from the group consisting of polyvinyl chloride, rubber hydrochloride, chlorinated rubber, chlorinated polyisobutylene and polyvinylidene dichloride.

2. A halogenated cross-linked aromatic amine polymer comprising a condensation product of one molecular proportion of aniline and at least one molecular proportion of aldehyde selected from the group consisting of formaldehyde and furfural, condensed in the presence of at least approximately one molecular proportion of acid at least as strong as phosphoric acid and reacted by heating at resin curing temperatures with from about 15.7% to about 23.44% on the weight of the reactants of an organic aliphatic chlorinated polymer selected from the group consisting of polyvinyl chloride, rubber hydrochloride, chlorinated rubber, chlorinated polyisobutylene and polyvinylidene dichloride.

3. A halogenated cross-linked aromatic amine polymer comprising a condensation product of one molecular proportion of primary aromatic amine selected from the group consisting of aniline, metaphenylene diamine, meta toluidine and diamino diphenyl methane and at least one molecular proportion of formaldehyde, condensed in the presence of at least approximately one molecular proportion of acid at least as strong as phosphoric acid and reacted by heating at resin curing temperatures with from about 15.7% to about 23.44% on the weight of the reactants of an organic aliphatic chlorinated polymer selected from the group consisting of polyvinyl chloride, rubber hydrochloride, chlorinated rubber, chlorinated polyisobutylene, and polyvinylidene dichloride.

4. A halogenated cross-linked aromatic amine polymer comprising a condensation product of one molecular proportion of aniline and at least one molecular proportion of aldehyde consisting at least in part of formaldehyde, condensed in the presence of at least approximately one molecular proportion of acid at least as strong as phosphoric acid, and reacted by heating at resin curing temperatures with from about 15.7% to about 23.44% on the weight of the reactants of an organic aliphatic chlorinated polymer selected from the group consisting of polyvinyl chloride, rubber hydrochloride, chlorinated rubber, chlorinated polyisobutylene and polyvinylidene dichloride.

5. A halogenated cross-linked aromatic amine polymer according to claim 1 in which the organic aliphatic chlorinated polymer is polyvinyl chloride.

6. A halogenated cross-linked aromatic amine polymer according to claim 1 in which the organic aliphatic chlorinated polymer is polyvinylidene dichloride.

SAMUEL S. KISTLER.